May 17, 1960     D. W. BOTSTIBER     2,936,890

MAGNETIC CHIP DETECTOR

Filed May 16, 1957

INVENTOR:
DIETRICH W. BOTSTIBER

United States Patent Office 2,936,890
Patented May 17, 1960

2,936,890

MAGNETIC CHIP DETECTOR

Dietrich W. Botstiber, Philadelphia, Pa.

Application May 16, 1957, Serial No. 659,574

4 Claims. (Cl. 210—86)

My invention refers to a novel and effective construction of an integral combination between a magnetic filter and a detector of, primarily ferrous chips, which were attracted by and have lodged themselves upon said filter, or on specific, preferred surfaces thereof.

The primary, combined object of my invention is to attract, and thus remove, ferrous particles that may be present within the lubrication system of various applications, and to indicate the presence of such attracted foreign elements or chips through appropriate means.

Another objective and advantage, respectively, of my invention is to provide a magnet having superior and permanent magnetic-force properties, in essence unaffected by the adverse and inclement environmental conditions and by the equally severe physical effects as may be encountered if used with high-speed ground or aircraft engines or equipment.

A further advantage of my invention is had by the employment of an electrically nonconductive material for the permanent magnets used with the construction in accordance with my invention allowing for a convenient, nonconductive, yet effectively magnetized area to which ferrous particles are readily attracted to then close, for example, an electric alarm circuit, or equivalent, without resorting to especially designed insulating areas, surfaces or assembly parts. If, in addition to the foregoing, a magnet material is employed having a grain-oriented structure or composition to retain its magnetism more proficiently, and being better suited for exerting a larger magnetic force across short distances and essentially flat shapes, respectively, such a permanent magnet may be arranged exteriorly with respect to the entire chip detector construction or assembly, thus reducing the design, construction and production problems to an optimum, combined with a substantial saving in cost.

An additional new and advantageous application of my magnetic chip detector results if used in conjunction with a self-closing drain plug insert, as portrayed and covered, respectively, in my U.S. Patent No. 2,704,156, allowing for the operation of my magnetic chip detector, the indication of ferrous deposits or those of graphite, and for the removal of the sludge-covered chip detector(s) without the spillage of lubricant, hydraulic fluid or the like.

Further advantages of my invention may be had by providing specific external wiring to and among the various chip detectors installed within a given arrangement so as to indicate either individual sludge conditions, or merely the fact that one of the chip detectors has collected a sufficient quantity of foreign matter to require replacement, or to indicate also the location of the thusly affected chip detector, either locally or remotely.

Possible embodiments of my invention and their functioning are presented in the accompanying drawings.

Figure 3:
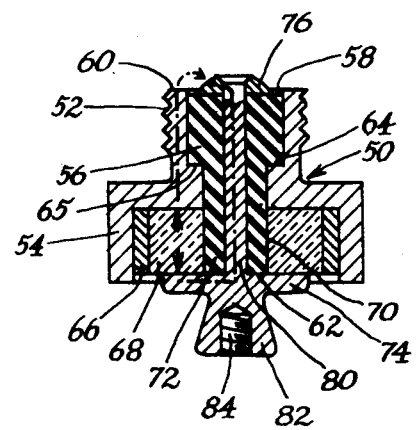
Figure 4:
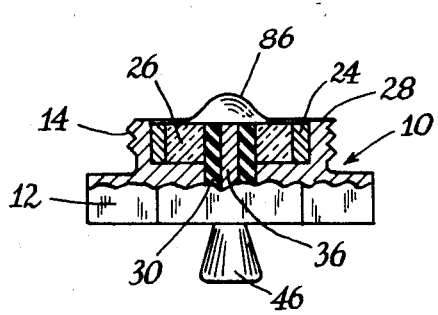
Figure 5:
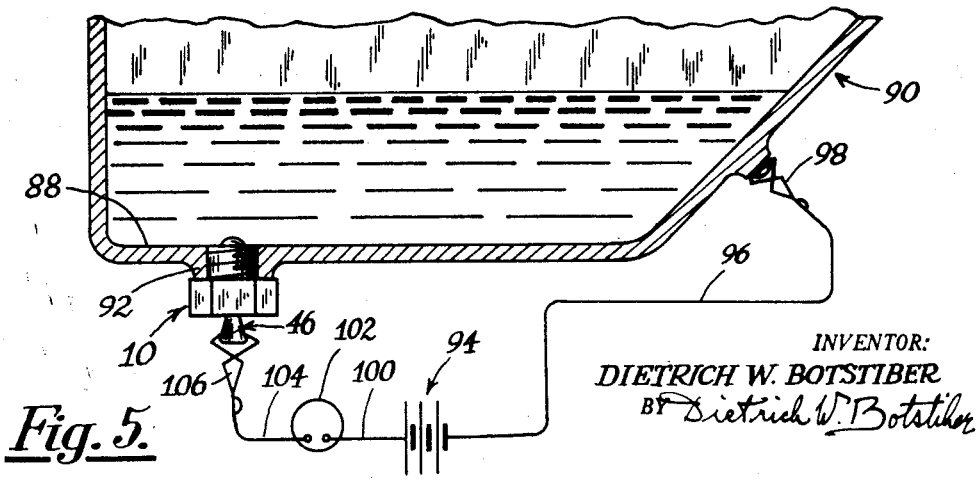

Fig. 3 portrays, in cross-sectional front elevation, another variety of a chip detector in accordance with my invention, however, having its permanent magnet disposed exteriorly with respect to the chip detector assembly proper;

Fig. 4 indicates, partly in cross-sectional front elevation and partly in view, a further possible modification of my chip detector, having its magnet installed in its interior and its magnetic center pole equipped with a flow-deflecting crown;

Fig. 5 presents, schematically and essentially in cross-section, a chip detector installation within a crank case or equivalent, and a typical wiring circuit for chip detection or indication.

Figure 1:
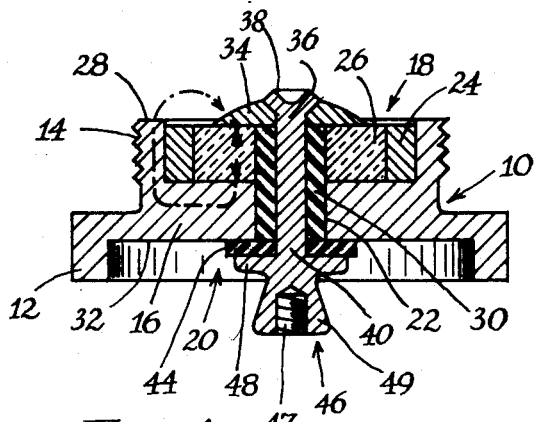
Fig. 1 illustrates, in cross-section, a front elevation of one variety of my magnetic chip detector, having its permanent magnet within the interior of the chip detector proper.

Referring now to the drawing, wherein like reference characters designate like or corresponding parts, and particularly to Fig. 1, a steel body is indicated at 10, having a flange-like, hexagon-shaped extension 12 at its lower end and a threaded portion 14 at its upper extremity. A web 16 is provided across the steel body, thus separating said steel body essentially into two cavities or ports, one 18 at the upper end and another one 20 at the lower end of the steel body 10. A through-hole 22 is located at the geometric axial center of the web 16. Within the upper cavity 18 a nonferrous, annular ring 24 is inserted. Preferred materials for said ring may be aluminum or brass. Inside of that annular, nonferrous ring 24 a, likewise annular, ring-shaped magnet 26 is arranged. This magnet is, preferably, of the ceramic, electrically nonconductive variety. This material is lighter in weight than metallic alloys used heretofore, amounting to an important improvement, particularly in mobile or aircraft applications, and it effectively resists demagnetization once it has been magnetized. The heights, speaking in terms of the front elevation, of both the annular nonferrous ring 24 and the annular ceramic-type permanent magnet 26 are identical and somewhat less than the inner clearance or depth of the upper cavity 18, thus rendering a ferrous, annular edge 28 surrounding the assembly parts or parts arrangement described above. Inside of the annular permanent magnet 26 an insulating tubing 30 is inserted, extending through the web hole 22 in such a manner that the upper face of said tubing 30 is flush with the upper face of the permanent magnet 26, and its lower face level with the lower face 32 of web 16, disregarding fabrication and assembly tolerances. A dome-shaped steel member 34, having an inverted taper in its center, is placed upon the upper surface of the permanent magnet 26. A metal shank 36 is inserted through the insulating tubing 30 in such a manner that its crimped end 38 is in intimate contact with the invertedly tapered hole of the member 34, whereas its stem 40 extends beyond the lower surface 32 of the web 16 of the steel body 10, to accommodate an insulating washer 44. The head construction 46 of the shank 36 comprises a flange 48 and a cone-shaped head 49 having a blind, tapped hole 47 to allow for the periodic or permanent attachment of electric wiring terminals, test clips or other parts required or desired for the completion of electric circuits to either detect or indicate the presence of ferrous or graphite matter lodged across the edge of the steel member 34 and the conductive area established by the annular face of the nonferrous ring 24 together with the adjacent, likewise conductive edge 28 of the upper steel body extremity 14.

The crimped and tapered end 38 of the screw 36 may be utilized to engage with an extension of a self-closing magnetic drain-plug construction, as illustrated in and covered by my U.S. Patent No. 2,704,156.

Figure 2:
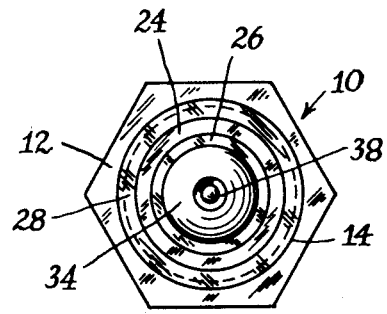
Fig. 2 shows a top view upon the chip detector arrangement of Fig. 1.

The plan view presented in Fig. 2 will complement the cross-sectional picture of Fig. 1. Particularly, the hexagon-shaped flange 12 of the steel body 10 becomes more apparent than it is in the former view as well as the concentrical assembly arrangement. Moreover, the annular air-gap existing between the metal member 34 and the ring steel body extremity edges 24, 14 is clearly visible in this illustration.

The operation of my magnetic chip detector arrangement and its construction now becomes self-explanatory. The entire assembly shown in Fig. 1 and Fig. 2, respectively, is inserted into a tapped hole provided within the housing wall of a crank case, gear case, journal bearing or the like, in such a manner and at such a location that the lubricant, or the fluid in general, can circulate or pass comparatively freely about said assembly and its magnetized elements, respectively. Ferrous particles, floating or suspended within the circulating lubricant or fluid are attracted by said magnetic parts arrangement and will position themselves in such a manner as to decrease the reluctance of this magnetic arrangement, i.e., across the annular air gap, thereby completing any electric circuit that may have been prepared across the metal center shank of said assembly and the mass, or ground, established by said steel body in intimate contact with the housing of the respective gear case, crank case, journal bearing, hydraulic line, or the like, essentially as shown in Fig. 5.

The electric circuit employed for either the testing or the indication of the presence of foreign matter lodged within the aforementioned annular air gap may be established temporarily by means of test leads, connected conversely to circuit testers of various types, or to battery-test lamp sets, or to ohmmeters, or equivalent apparatus known in the art. Or, such a test or indicating circuit may be permanently mounted between each such magnetic chip detector and a power and indicating facility, whereby numerous types of wiring means or systems may be utilized to provide selectively, individually, or combined acting indicating devices for those chip detectors having accumulated conductive foreign matter, or graphite deposits, and thus requiring cleaning or replacement. Most of such means, circuits and devices are known in the art. However, a possible test circuit is portrayed, schematically, in Fig. 5, primarily to explain one principle and to emphasize the simplicity of the monitoring.

The chip detector variety illustrated in Fig. 3 comprises a steel body 50, comparable to that used for the detector variety of Fig. 1 and Fig. 2, except having no web. A threaded extremity 52 and a hexagon-shaped extension 54 are likewise provided at corresponding locations. The major portion of the one, web-less steel body cavity or port is occupied by an electrically insulating, substantially cylindrical plug 56 which is disposed within the interior of the steel body 50 through bonding to the inside of the threaded body portion 52, through press fit among these two members, through seating upon faces and shoulders, or equivalent means. The upper face of the cylindrical plug 56 is substantially level with the edge 60 of the steel body 50. Upon assembly, only an annular area will show of the upper face 58 of the plug 56. The lower face 62 of plug 56 extends, approximately, to the lower face level of the hexagon-shaped flange 54. The plug 56 is offset at 64 to seat upon the shoulder 65 integral with the upper port. The now remaining space contains a nonferrous annular ring 66, preferably of aluminum and, within its interior, a likewise annular, permanent magnet 68, preferably of electrically nonconductive, ceramic, grain-oriented magnetic material. It should be noted that this magnet may be quite tall and have an outside diameter large—per se—and compared with the small diameter of the threaded extremity 52 of the steel body 50. This magnet installation, external with respect to the chip detector portion which is exposed to the fluid, permits economic design, extended life expectancy of the entire device and low-cost production. By virtue of the hole 70 within the annular magnet 68 it may be positioned about the boss 72 of plug 56. A steel flange 74 is disposed adjacent to the lower face of the magnet 68. The aforementioned members are assembled by means of the shank 80 of ferrous material and integral with the flange 74. The end of the shank 80 extends through a hole of the top member 76 and is riveted over it. Integral with the flange 74 is, further, a cone-shaped head 82 having a blind, tapped hole 84 to allow for the attachment of wiring means, as in the previous example. The magnetic circuit, energized by the permanent magnet 68 disposed within the bottom port of the structure 50 presents itself readily—as shown in dashed and dotted lines—consisting of the threaded extremity 52, the flange 74, the steel shank 80 and the top member 76. This leaves an annular air gap existing between the top member 76 and the edge 60 of the extremity 52, essentially as indicated at the exposed annular plug surface 58, to attract foreign, ferrous matter suspended within the fluid which is circulating about this portion of the chip detector.

The operation, or functioning, of this chip detector variety is, substantially, identical with that described for the previous chip detector construction(s), except that the convex-shaped top member 76 will cause the sludge to bypass the chip detector, thus keeping the chip detector surface essentially clean and operative for its primary objective, i.e., to attract ferrous particles and to indicate their presence.

This advantageous feature may be enhanced by means of a construction portrayed in Fig. 4. This chip detector variety, shown partly in cross section and partly in front elevation, resembles essentially that presented in Fig. 1 and this circumstance is emphasized by the use of reference numerals identical to those. The only exception over the former mode is the finish of the top member 86 which, in this case, is shaped in accordance with hydro-dynamic flow principles to further facilitate the passing of sludge or other particles not to be attracted by the annular air gap, in this case coinciding with the exposed annular face of the nonferrous, likewise annular ring 24.

A possible electrical circuit arrangement for the monitoring or testing of the chip detector is shown in Fig. 5. The bottom 88 of, say, a crank case 90 is provided with a tapped extrusion 92 to receive the chip detector structure 10 or 50 by means of the threaded portion of the upper steel body extremity. An electric power source is shown at 94, and its external circuit is completed through a lead 96 attached, by means of, say, a test clip 98 to a suitable point of the crank-case mass 90, another lead 100 connected to a continuity tester, or an ohmmeter or an equivalent instrument 102 and by a third lead 106 attached to the shank extension 46 of the chip detector 10.

The foregoing circuit, utilizing, for example, the mass of the crank case as a—grounded—return path will remain inactive, for test purposes as well as in operational use, so long as no electrically conductive matter has lodged itself across the gap of the magnetic circuit, exposed to the fluid inside the crank case. However, if electrically conductive substance has been attracted across said magnetic gap, the electric circuit will be completed and the instrument 102 will indicate this condition. The instrument 102 may be of the indicating, audible or recording variety or of any combination thereof. The electrical wiring 96, 100, 104 may be permanently installed using, preferably, parallel circuits supplied from one common electric power source, each such circuit having its own detection instrument to aid in the identification and replacement of the affected detector.

It is understood that the constructions and arrangements described herein represent but basic embodiments of my magnetic chip detector and that numerous modifications, alterations and rearrangements are possible without departing from the spirit of my invention.

What is claimed is:

1. A magnetic collector having a surface adapted to to be exposed to liquid from which electrically conducting and magnetically inductive material is to be removed, said collector embodying two spaced electrically conducting elements exposed in said surface, a permanent magnet formed of electrically insulating material presenting a face which is exposed in said surface and bridging the space between said elements while insulating said elements electrically from each other whereby a bridging accumulation of electrically conducting material on the exposed surface of the magnet will establish an electrically conducting path between said elements.

2. A magnetic collector having a surface adapted to be exposed to liquid from which electrically conducting and magnetically inductive material is to be removed, said collector embodying a permanent magnet having two pole pieces exposed in said surface, one of said pole pieces being formed of ferrous metal and the other pole piece being formed of magnetically permeable but electrically insulating material, and an electrically conducting member exposed in said surface and spaced from said ferrous metal pole piece by the electrically insulating pole piece, said member cooperating with said ferrous metal pole piece to complete an electrically conducting path extending from said member to said ferrous metal pole piece upon the occurrence of a bridging accumulation of electrically conducting material upon the exposed surface of said electrically insulating pole piece.

3. A magnetic collector in the form of an externally threaded plug for application to a threaded connection in a liquid container, said plug having a surface adapted when applied to the container to be exposed to liquid in said container from which electrically conducting and magnetically inductive material is to be removed, said plug embodying a permanent magnet having two spaced pole pieces exposed in said surface, one of said pole pieces being formed of ferrous metal and the other pole piece being formed of magnetically permeable but electrically insulating material, a non-magnetic electrically conducting element extending across the space between said ferrous metal pole piece and said electrically insulating pole piece, and an electrically conducting member exposed in said surface and spaced from said element by the electrically insulating pole piece, said member cooperating with said element to complete an electrically conducting path extending from said member to said ferrous metal pole piece upon the occurrence of a bridging accumulation of electrically conducting material upon the exposed surface of said electrically insulating pole piece.

4. A magnetic collector in the form of an externally threaded plug adapted to be applied to a complementary connection in a liquid container, said plug having a surface arranged to be exposed to liquid in the container from which electrically conducting and magnetically inductive material is to be removed, two spaced electrically conducting elements carried by said plug and exposed in said surface, a permanent magnet formed of electrically insulating material exposed in said surface and filling the space between said elements and serving to insulate said elements electrically from each other and means connected to said elements for passing current through said elements and across said surface upon accumulation of a bridging amount of electrically conducting material on the surface of said permanent magnet.

References Cited in the file of this patent

UNITED STATES PATENTS

| 2,429,920 | Bourne | Oct. 28, 1947 |
| 2,450,630 | Bourne | Oct. 5, 1948 |
| 2,462,715 | Booth | Feb. 22, 1949 |